United States Patent Office 2,969,304
Patented Jan. 24, 1961

---

2,969,304

MANUFACTURE OF POLYOXYGENATED STEROIDS

Albert Wettstein and Ernst Vischer, Basel, and Charles Meystre, Arlesheim, Switzerland, assignors to Ciba Pharmaceutical Products Inc., Summit, N.J.

No Drawing. Filed July 12, 1955, Ser. No. 521,628

Claims priority, application Switzerland July 15, 1954

19 Claims. (Cl. 195—51)

This invention relates to a process for the manufacture of polyoxygenated steroids by introducing oxygen in various positions of the steroid molecule by biochemical methods.

Methods for introducing oxygen into certain positions of steroids with the aid of micro-organisms are well-known. For example, Murray et al. in U.S. Patent 2,602,769, describe a method for introducing oxygen in the 11-position of the steroid molecule. In our copending U.S. application Serial No. 500,994, filed April 12, 1955, we describe a process for oxygenating steroids in the 17-position with the aid of certain moulds. We also describe in our copending U.S. application Serial No. 518,922, filed June 29, 1955, now U.S. Patent 2,778,776, methods for introducing oxygen into the 21-position of steroids by biochemical means. It is also known that with the aid of cultures of certain moulds steroids can be oxygenated simultaneously in various positions, for example, in the 6- and 11-positions. However, it has not hitherto been possible to introduce oxygen simultaneously by a biochemical method into at least two of the important 11-, 17- and 21-positions. Such a process would clearly be of great technical importance.

We have now discovered that polyoxygenated steroids can be prepared by causing a steroid which is non-oxygenated in at least two of the 11-, 17- and 21-positions to react in a single operation with enzymes from aerobic cultures of at least two of a group of three strains of fungi capable of introducing oxygen into the 11-, 17- or 21-positions, respectively.

The starting materials used in the present process are advantageously compounds of the pregnane series, among which are the saturated and unsaturated derivatives of any desired configuration of 10,13-dimethyl-17-ethyl-cyclopentano-polyhydrophenanthrene, as well as its higher and lower homologs, for example the corresponding A-nor-, D-homo- and 19-nor-compounds. Double bonds may be present, for example, in the 1-, 4-, 5-, 6-, 7-, 9-, 11-, 14-, 15- and/or 16-positions. The configuration of the starting material is advantageously that of pregnane, 5α-pregnane, 17α-pregnane or the corresponding racemates such as are obtained by total synthesis. As such starting materials there are used above all compounds oxygenated in the 3- and 20-positions and, if desired, in the 18- and/or in one of the 11-, 17- and 21-positions, and functional derivatives of such compounds. Thus one may employ pregnanes which contain in said positions a free or functionally converted oxo- or hydroxyl group, for example, esters, ethers, thioethers, thiol- or thion-esters, acetals, mercaptals, ketals, enol derivatives such as enol esters or enamines, hydrazones, semi-carbazones and the like. They may contain further substituents, for example, free or functionally converted hydroxyl or oxo groups, for example, in the 1-, 2-, 6-, 7-, 12-, 15-, 16- or 19-position, and especially halogen atoms such as chlorine or fluorine in the 9-position. Specific starting materials are, inter alia: progesterone, 17α-progesterone, 16α-hydroxy-, 17α-hydroxy- or 18-hydroxy-progesterone, cortexone, 11-keto-progesterone, 11α- and also 11β-hydroxy-progesterone, 9,11- or 11,12-dehydro-progesterone, 19-hydroxy-progesterone, 9-chloro- or 9-fluoro-11β-hydroxy-progesterone, 11β,18-dihydroxy-progesterone, 11β-hydroxy-18-oxo-progesterone, 9-chloro- or 9-fluoro-11β-hydroxy-18-oxo-progesterone, 11,18-dioxo-progesterone, 19-nor-progesterone, 19-nor-11β-hydroxy-18-oxo-progesterone, pregnenolone, the corresponding 1-dehydro compounds, for example, 1-dehydro-progesterone, 1-dehydro-17α-hydroxy-progesterone, 1-dehydro-11-keto-, 11α- or -11β-hydroxy-progesterone, or functional derivatives of these compounds.

The enzymes which are capable of introducing oxygen in the 11-position are advantageously produced from aerobic cultures of fungi of the genus Rhizopus, Mucor, Aspergillus, Penicillium, Curvularia, Cunninghamella, Spondylocladium or Streptomyces. There are preferably used active strains of the species *Rhizopus nigricans*, *Cunninghamella blakesleeana*, *Curvularia brachyspora*, and *Curvularia lunata*. For introducing oxygen into the 17-position there are suitable enzymes from aerobic cultures of fungi of the genera Trichothecium (Acrothecium), Leptosphaeria, Cucurbitaria, Acrospeira, Lophotricus, Melanospora, and Thielavia, especially active strains of *Trichothecium roseum*, *Leptosphaeria maculans*, *Cucurbitaria laburni*, *Acrospeira levis*, *Lophotrichus martinii*, *Melanospora parasitica* and *Thielavia terricola*. Enzymes for introducing oxygen into the 21-position are advantageously obtained with the aid of aerobic cultures of fungi of the genera Ophiobolus or Sclerotinia especially of active strains of *Ophiobolus herpotrichus*, and *Sclerotinia fructicola*. Although isolated or concentrated enzyme preparations may be used, we prefer to employ crude growing cultures of fungi, suspensions of the mycelium, or filtrates therefrom.

The culture solutions used for the growth of these fungi are advantageously kept in motion, that is to say, agitated or stirred, and contain assimilable carbon, especially carbohydrates, and if desired also growth substances, for example, corn steep liquor, beer wort, and inorganic salts. Accordingly, there may be used natural, synthetic or semi-synthetic nutrient solutions. There are advantageously used nutrient solutions which provide optimum conditions of growth for all the fungi used. Alternatively, nutrient or growth substances especially suitable for the second or third fungus may be added later.

It is to be understood that the introduction of oxygen into two different or three different positions, as for example, the 11- and 17-, 11- and 21- or 11-, 17- and 21-positions is accomplished by employing combinations of the respective fungi capable of introducing oxygen into these particular positions. Thus, if it is desired to introduce oxygen into the 11- and 17-positions of this steroid, aerobic cultures of Rhizopus and Trichothecium fungi are employed; for oxygenating the 11- and 21-positions of a steroid, aerobic cultures of Rhizopus and Ophiobolus are employed, and so on.

As pointed out above, the process is carried out in a single operation. The organisms required for the oxygenation are grown separately in suitable containers and under conditions such as are known in the production of antibiotics, e.g. the deep tank process, where the cultures are agitated, for example by stirring, and aerated. After the cultures have been developed they are combined and the desired starting material is added in the form of a fine dispersion or solution, for example in methanol, acetone or ethylene glycol. The medium is then further incubated until oxygenation has been attained, preferably a period of about 2-6 days.

Alternatively, and if so desired, oxygenation of at least two of the 11-, 17- and 21-positions may be advantageously carried out in succession. In carrying out the process in accordance with this modification, the organism required for the first oxygenation is grown in a suitable container and under conditions such as are known in the production of antibiotics, e.g. the deep tank process, where the cultures are agitated, for example by stirring, and aerated. After the culture has been developed the desired starting material is added in the form of a fine dispersion or solution (as described above) and the medium is further incubated until maximum oxygenation has been effected, preferably 2–6 days. There is then added to the reaction mixture without previously filtering or isolating the oxidation product therefrom, a well-developed culture of the second organism and, if necessary, appropriate nutrient substances and growth substances, and the incubation is continued. If desired, this operation is repeated with a third micro-organism. The course of the individual oxidations can be followed by paper chromatography.

At the end of the oxidation period, whether the preferred simultaneous oxygenation process or the modification is employed, the mycelium is removed and the filtrate and/or the mycelial mass is extracted with suitable solvents such as chloroform, methylene chloride or ethylacetate. The reaction product is then isolated from the extract by well-known methods such as, for example, by a demixing process, adsorption, chromatography, crystallization, conversion into functional derivatives, such as Girard compounds or the like.

The fungoid cultures or enzymes may be added in any order of succession. It is easy to determine by preliminary tests which order of addition is most advantageous.

As will be seen from the examples, the process of this invention is useful in the preparation of a wide variety of well-known and useful therapeutic products. As examples of the more important of these products may be given cortisone, hydrocortisone, 1-dehydro-cortisone, 1-dehydro-hydrocortisone, 17$\alpha$-hydroxy-cortexone, aldosterone and corticosterone.

The following examples illustrate the invention:

Example 1

50 cc. of beer wort are sterilized in a flask of 500 cc. capacity and then inoculated with *Ophiobolus herpotrichus*. The culture is agitated at 27° C. After 3 days it will have developed well, and there is then added under sterile conditions a solution of 15 milligrams of progesterone in 0.75 cc. of acetone. At the same time 50 cc. of beer wort is sterilized in a second flask and inoculated with a strain of *Curvularia brachyspora*. The two cultures are then agitated in the same manner at 27° C. After 3 days the fully grown Curvularia culture is added under sterile conditions to the Ophiobolus culture. The combined cultures are further agitated. After 3 days the mycelium is separated off and the culture filtrate is extracted by agitation three times with 30 cc. of ethyl acetate on each occasion. The extracts are washed with water, dried and evaporated. Examination of the residue by paper chromatography shows that 11$\beta$,21-dihydroxy-progesterone (corticosterone) is present.

By using in the above process 18-oxo-progesterone, instead of progesterone, there is obtained aldosterone.

Example 2

As described in Example 1 a solution of 15 milligrams of progesterone in 0.75 cc. of acetone is added to a culture of *Ophiobolus herpotrichus* in 50 cc. of beer wort. At the same time 50 cc. of sterilized beer wort in a second flask are inoculated with *Trichothecium roseum*. Both cultures are agitated at 27° C. After three days they are combined under aseptic conditions, and the mixture is further agitated for three days at the same temperature. The mycelium is then separated off, and the culture filtrate is extracted as described in Example 1. As determined by paper chromatography the extraction residue contains 17$\alpha$-hydroxy-cortexone.

Example 3

By using in Example 2 11-keto-progesterone, instead of progesterone, and incubating in the manner described with cultures of *Ophiobolus herpotrichus* and *Trichothecium roseum*, 11-keto-17$\alpha$,21-dihydroxy-progesterone (cortisone) can be detected in the extraction residue.

Example 4

By using in Example 2 11$\beta$-hydroxy-progesterone, instead of progesterone, and incubating in the same manner with cultures of *Ophiobolus herpotrichus* and *Trichothecium roseum* there is obtained an extraction residue in which 11$\beta$,17$\alpha$,21-trihydroxy-progesterone (hydrocortisone) can be detected.

Example 5

In the manner described in Example 1 a solution of 15 milligrams of progesterone in 0.75 cc. of acetone is added to a culture of *Ophiobolus herpotrichus* in 50 cc. of beer wort under sterile conditions. At the same time 50 cc. of sterile beer wort in a second flask are inoculated with *Trichothecium roseum*. Both cultures are agitated at 27° C. and combined after three days. At the same time 50 cc. of sterile beer wort in a third flask are inoculated with *Rhizopus nigricans*. This culture and the aforesaid culture mixture are agitated for three days at 27° C., during which the *Rhizopus culture* develops well. It is then combined under sterile conditions with the culture mixture. The mixture is agitated for a further three days at 27° C. and then the mycelium is separated off. The culture filtrate is extracted in the manner described in Example 1. Examination of the extraction residue by paper chromatography shows that 11$\alpha$,17$\alpha$,21-trihydroxy-progesterone is present.

Example 6

The procedure is the same as that described in Example 5 with the exception that instead of the culture of *Rhizopus nigricans* there is added a culture of *Cunninghamella blakesleeana* in 50 cc. of beer wort to the culture mixture of *Ophiobolus herpotrichus* and *Trichothecium roseum*. By incubating and extracting in an analogous manner there is obtained an extraction residue which contains 11$\beta$,17$\alpha$,21-trihydroxy-progesterone (hydrocortisone) and 11-keto-17$\alpha$,21-dihydroxy-progesterone (cortisone).

Example 7

The order in which the cultures are added in Example 6 is varied by incubating the progesterone first with a culture of *Cunninghamella blakesleeana* and then adding first in the manner described a culture of *Ophiobolus herpotrichus* and then a culture of *Trichothecium roseum*. The extraction residue obtained as described above likewise contains 11$\beta$,17$\alpha$,21-trihydroxy-progesterone (hydrocortisone) and 11-keto-17$\alpha$,21-dihydroxy-progesterone (cortisone).

Example 8

50 cc. of sterile beer wort are inoculated with *Cunninghamella blakesleeana*. The culture is agitated for two days at 27° C. and then a solution of 15 milligrams of 11-desoxy-corticosterone (cortexone) in 0.75 cc. of acetone is added under sterile conditions. At the same time 50 cc. of sterile beer wort are inoculated in a second flask with *Trichothecium roseum*. Both cultures are agitated for an additional two days at the same temperature, and then combined under sterile conditions. The mixture is further agitated and the mycelium is separated off after two days. The extraction of the culture filtrate is carried out in the manner described in Example 1. The extraction residue contains 11$\beta$,17$\alpha$,21-trihydroxy-progesterone (hydrocortisone) in addition to 11-keto-17$\alpha$,21-dihydroxy-progesterone (cortisone).

Example 9

50 cc. of sterile beer wort are inoculated with *Curvu-*

*laria lunata* in a flask and agitated for 2 days at 27° C. A solution of 15 mg. of cortexone (11-desoxy-corticosterone) in 0.5 cc. of acetone is then added under sterile conditions. At the same time 50 cc. of sterile beer wort are inoculated in a second flask with *Leptosphaeria maculans*. Both cultures are agitated for 24 hours at the same temperature, and then combined under sterile conditions. The mixture is agitated for an additional two days and the mycelium is separated off. The culture filtrate is extracted with ethyl acetate as described in Example 1. The extraction residue contains hydrocortisone in addition to cortisone.

Example 10

By using in the preceding example a solution of 15 mg. of 1-dehydro-cortexone in 0.5 cc. of acetone in place of cortexone, and incubating in the same manner with cultures of *Curvularia lunata* and *Leptosphaeria maculans*, there is obtained an extraction residue containing 1-dehydro-hydrocortisone in addition to 1-dehydro-cortisone.

Example 11

In a shaking vessel having a capacity of 18 liters, 3.6 liters of beer wort are sterilized and inoculated with 400 cc. of a 2 day old submerged culture of *Ophiobolus herpotrichus* grown on beer wort. The whole is agitated for 2 days at 27° C. to permit development of the culture. There is then added a solution of 1.0 gram of progesterone in 25 cc. of acetone under sterile conditions. Simultaneously 3.6 liters of sterile beer wort in a second shaking vessel are inoculated with 400 cc. of a 3 day old submerged culture of *Trichothecium roseum* also grown on beer wort. The two vessels are agitated at 27° C. for 3 days. The Trichothecium culture which is then fully grown is transferred under sterile conditions to the 18-liter vessel, and at the same time 3.6 liters of sterile beer wort are inoculated in a further shaking vessel with 400 cc. of a culture of *Cunninghamella blakesleeana* 24 hours old and grown on beer wort. These shaking vessels, including that which contains the culture mixture just mentioned, are agitated for 3 days at 27° C., and their contents are then united under sterile conditions, and then the whole is agitated for a further 2 days at the aforesaid temperature. The mycelium is then separated off. The culture filtrate is extracted four times with 3 liters of ethyl acetate on each occasion. The extracts are washed three times with 500 cc. of water on each occasion, dried and evaporated. The residue so obtained (1.1 grams) is dissolved in 160 cc. of methanol, 40 cc. of water are added, and the whole is extracted three times with 50 cc. of pentane on each occasion. The pentane extracts contain only oily impurities, while the steroids remain in the methanolic solution. The latter solution is evaporated under reduced pressure and dried in a high vacuum. The residue is chromatographed on a column of 30 grams of silica gel (height 10 cm., width 2.5 cm.) by the fractional elution method. Elutriation is carried out first with methylene chloride, then with chloroform and with mixtures of chloroform and acetone, and finally with acetone. The individual fractions (150 cc.) are tested by paper chromatography. The fractions elutriated with methylene chloride and with chloroform contain impurities, a small amount of starting material and 11-desoxycorticosterone, and 11-keto-17$\alpha$,21-dihydroxy-progesterone (cortisone) is present in the mixtures of chloroform and acetone (9:1 and 8:2). The fractions in question are evaporated and the cortisone is obtained in the form of crystals melting at 208–216° C. after recrystallization from a mixture of acetone and isopropyl ether. The chloroform-acetone (1:1) fractions contain 11$\beta$,17$\alpha$,21-trihydroxy-progesterone (hydrocortisone), which melts at 204–210° C. after recrystallization from ether.

Example 12

By using in Example 2 1-dehydro-11-keto-progesterone, instead of progesterone, and incubating in the same manner with cultures of *Ophiobolus herpotrichus* and *Trichothecium roseum*, 1-dehydro-cortisone can be detected in the extraction residue.

Example 13

By using in Example 3 1-dehydro-11$\beta$-hydroxy-progesterone, instead of progesterone, and incubating in the same manner with cultures of *Ophiobolus herpotrichus* and *Trichothecium roseum*, 1-dehydro-hydrocortisone can be detected in the extraction residue.

Example 14

By using in Example 6 1-dehydro-progesterone, instead of progesterone, and incubating in the same manner with cultures of *Ophiobolus herpotrichus, Trichothecium roseum* and *Cunninghamella blakesleeana*, 1-dehydro-hydrocortisone in addition to 1-dehydro-cortisone can be detected in the extraction residue.

Example 15

Two portions of 50 cc. of beer wort, each in a flask of 500 cc. capacity, are sterilized. One is inoculated with *Ophiobolus herpotrichus* and the other with *Curvularia lunata*. The cultures are agitated at 27° C. After 3 days, they will have developed well. They are then combined under aseptic conditions and there is added to the combined cultures under sterile conditions a solution of 15 milligrams of progesterone in 0.75 cc. of acetone. The combined cultures are further agitated at 27° C. After three days the mycelium is separated off and the culture filtrate is extracted as described in Example 1. Examination of the residue by paper chromatography shows that 11$\beta$,21-dihydroxy-progesterone (corticosterone) is present.

Example 16

Three portions of 50 cc. of beer wort, each in a flask of 500 cc. capacity, are sterilized. The first is inoculated with *Ophiobolus herpotrichus*, the second with *Trichothecium roseum* and the third with *Cunninghamella blakesleeana*. The cultures are agitated at 27° C. After three days they will have developed well and are then combined aseptically. To the combined cultures there is added under sterile conditions a solution of 15 milligrams of progesterone in 0.75 cc. of acetone. The combined cultures are further agitated at the same temperature. After three days the mycelium is separated off and the culture filtrate is extracted as described in Example 1. Examination of the residue by paper chromatography shows, that 11$\beta$,17$\alpha$,21-trihydroxy-progesterone (hydrocortisone) and 11-keto-17$\alpha$,21-dihydroxy-progesterone (cortisone) are present.

Example 17

Cultures of *Ophiobolus herpotrichus, Trichothecium roseum* and *Cunninghamella blakesleeana* are prepared as described in Example 16. The mycelia of the three well developed cultures are separated off by filtration, combined and suspended in 150 cc. of distilled water. There is added to this suspension a solution of 15 milligrams of progesterone in 0.75 cc. of acetone. The mycelial suspension is then agitated at 27° C. After three days, the mycelium is separated off and the filtrate is extracted as described in Example 1. Examination of the residue by paper chromatography shows the presence of 11$\beta$,17$\alpha$,21-trihydroxy-progesterone (hydrocortisone) and of 11-keto-17$\alpha$,21-dihydroxy-progesterone (cortisone).

What is claimed is:

1. In a method for oxygenating at least two of the 11-, 17- and 21-positions in a steroid compound, the step which comprises contacting a member of the group consisting of an 11-, 17-non-oxygenated, an 11-, 21-non-oxygenated, a 17-, 21-non-oxygenated and an 11-, 17-, 21-non-oxygenated pregnane compound with enzymes produced from at least two fungi selected from at least two of the groups consisting of (a) the order Mucorales and the genera Curvularia, Aspergillus, Streptomyces and Coniothyrium for oxidation in the 11-position; (b) the species *Trichothecium roseum, Leptosphaeria maculans, Cucurbittaria laburni, Acrospeira levis, Lophotrichus martinii, Melanospora parasitica* and *Thielavia terricola* for oxidation in the 17-position; and (c) the species *Ophiobolus herpotrichus* and *Sclerotinia fructicola* for oxidation in the 21-position, with the proviso that the fungi employed are those capable of oxygenating the corresponding non-oxygenated positions, said contact being effected in a single operation, the different oxygenating reaction taking place in a single culture vessel.

2. In a method for oxygenating at least two of the 11-, 17-, and 21-positions in a steroid compound, the step which comprises contacting an 11-, 17-non-oxygenated pregnane with a fungus selected from the group consisting of the order Mucorales and the genera Curvularia, Aspergillus, Streptomyces and Coniothyrium, and a fungus selected from the group consisting of the species *Trichothecium roseum, Leptosphaeria maculans, Cucurbitaria laburni, Acrospeira levis, Lophotrichus martinii, Melanospora parasitica* and *Thielavia terricola* for oxidation in the 17-position, said contact being effected in a single operation, the different oxygenating reaction taking place in a single culture vessel.

3. In a method for oxygenating at least two of the 11-, 17-, and 21-positions in a steroid compound, the step which comprises contacting a 17,21-non-oxygenated pregnane with a fungus selected from the group consisting of the species *Trichothecium roseum, Leptosphaeria maculans, Cucurbitaria laburni, Acrospeira levis, Lophotrichus martinii, Melanospora parasitica* and *Thielavia terricola* for oxidation in the 17-position and a fungus selected from the group consisting of the species *Ophiobolus herpotrichus* and *Sclerotinia fructicola* for oxidation in the 21-position, said contact being effected in a single operation, the different oxygenating reaction taking place in a single culture vessel.

4. In a method for oxygenating at least two of the 11-, 17-, and 21-positions in a steroid compound, the step which comprises contacting an 11,21-non-oxygenated pregnane compound with a fungus selected from the group consisting of the order Mucorales and the genera Curvularia, Aspergillus, Streptomyces and Coniothyrium and a fungus selected from the group consisting of the species *Ophiobolus herpotrichus* and *Sclerotinia fructicola* for oxidation in the 21-position, said contact being effected in a single operation, the different oxygenating reaction taking place in a single culture vessel.

5. In a method for oxygenating at least two of the 11-, 17-, and 21-positions in a steroid compound, the step which comprises contacting an 11-, 17-, 21-non-oxygenated pregnane with a fungus selected from the group consisting of the order Mucorales and the genera Curvularia, Aspergillus, Streptomyces and Coniothyrium and a fungus selected from the group consisting of the species *Trichothecium roseum, Leptosphaeria maculans, Cucurbitaria laburni, Acrospeira levis, Lophotrichus martinii, Melanospora parasitica* and *Thielavia terricola* for oxidation in the 17-position and a fungus selected from the group consisting of the species *Ophiobolus herpotrichus* and *Sclerotinia fructicola* for oxidation in the 21-position, said contact being effected in a single operation, the different oxygenating reaction taking place in a single culture vessel.

6. Process according to claim 1 wherein as a fungus of group (a) a fungus selected from the species *Rhizopus nigricans, Cunninghamella blakesleeana, Curvularia lunata,, Curvularia brachyspora, Aspergillus niger, Aspergillus ochraceus* and *Streptomyces fradiae* is used.

7. Process according to claim 1, wherein the addition of at least two different cultures of oxidizing fungi is made simultaneously.

8. Process according to claim 1, wherein the starting material is progesterone and wherein the fungi employed are *Ophiobolus herpotrichus, Trichothecium roseum* and *Cunninghamella blakesleeana.*

9. A process as set forth in claim 1 wherein the steroid starting material is progesterone.

10. A process as set forth in claim 1 wherein the steroid starting material is 11-keto-progesterone.

11. A process as set forth in claim 1 wherein the steroid starting material is desoxycorticosterone.

12. A process as set forth in claim 1 wherein the steroid starting material is a $\Delta^{1,4}$-pregnadiene.

13. A process as set forth in claim 1 wherein the steroid starting material is $\Delta^{1,4}$-3,20-dioxo-pregnadiene.

14. A process as set forth in claim 1 wherein the steroid starting material is $\Delta^{1,4}$-3,20-dioxo-11β-hydroxy-pregnadiene.

15. A process as set forth in claim 1 wherein the fungi employed are *Ophiobolus herpotrichus* and *Trichothecium roseum.*

16. A process as set forth in claim 1 wherein the fungi employed are *Ophiobolus herpotrichus* and *Rhizopus nigricans.*

17. A process as set forth in claim 1 wherein the fungi employed are *Ophiobolus herpotrichus* and *Cunninghamella blakesleeana.*

18. A process as set forth in claim 1 wherein the fungi employed are *Curvularia lunata* and *Leptosphaeria maculans.*

19. A process as set forth in claim 1 wherein the fungi employed are *Ophiobolus herpotrichus, Trichothecium roseum* and *Cunninghamella blakesleeana.*

References Cited in the file of this patent

UNITED STATES PATENTS

| Number | Name | Date |
|---|---|---|
| 2,602,769 | Murray et al. | July 8, 1952 |
| 2,649,401 | Haines et al. | Aug. 18, 1953 |
| 2,649,402 | Murray et al. | Aug. 18, 1953 |
| 2,658,023 | Shull | Nov. 3, 1953 |
| 2,778,776 | Wettstein et al. | Jan. 22, 1957 |
| 2,793,162 | Thoma et al. | May 21, 1957 |
| 2,831,798 | McAleer et al. | Apr. 22, 1958 |

OTHER REFERENCES

J.A.C.S. 74 (1952), pp. 3962–3963.
Meister et al.: J.A.C.S. 76 (1954), pp. 4050–4051.
Meystre et al.: Helvetica Chim. Acta 37 (1954), pp. 1548–1553.

UNITED STATES PATENT OFFICE
CERTIFICATE OF CORRECTION

Patent No. 2,969,304                      January 24, 1961

Albert Wettstein et al.

It is hereby certified that error appears in the above numbered patent requiring correction and that the said Letters Patent should read as corrected below.

Column 7, lines 17, 43 and 54, after "Coniothyrium", each occurrence, insert -- for oxidation in the 11-position --.

Signed and sealed this 14th day of November 1961.

(SEAL)
Attest:

ERNEST W. SWIDER
Attesting Officer

DAVID L. LADD
Commissioner of Patents
USCOMM-DC